Jan. 28, 1936.  J. RADLOFF  2,029,189
DOUBLE ACTING INTERNAL COMBUSTION ENGINE
Filed Dec. 18, 1934
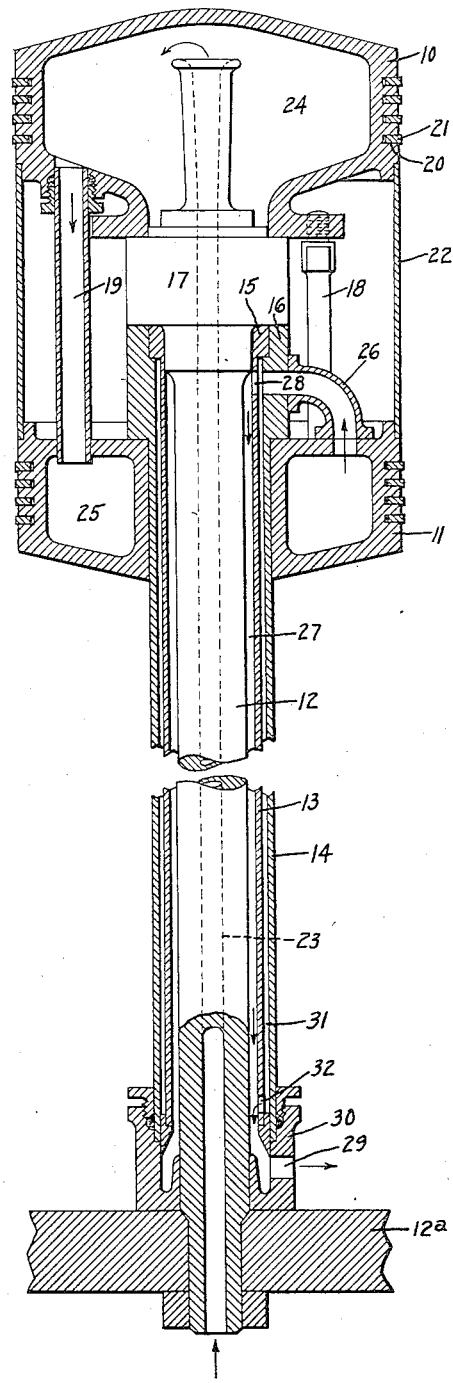
Inventor:
Johannes Radloff,
by Harry E. Dunham
His Attorney.

Patented Jan. 28, 1936

2,029,189

UNITED STATES PATENT OFFICE 2,029,189

DOUBLE ACTING INTERNAL COMBUSTION ENGINE

Johannes Radloff, Berlin, Germany, assignor to General Electric Company, a corporation of New York Application December 18, 1934, Serial No. 758,011
In Germany April 14, 1934

5 Claims. (Cl. 123—176)

The present invention relates to double acting internal combustion engines, more specifically to cooling arrangements of the type of engines in which the piston stems of the double acting pistons are surrounded by a tubular member to protect the stems against the excessive heat of the combustion gases.

In the usual arrangement, the stems are surrounded by a tubular member which forms an annular space through which cooling medium such as water is conducted. Experience with this type of cooling arrangement has shown that the intensive cooling effect of the medium conducted through said annular space is detrimental because it causes rapid deterioration of the tubular members. This rapid deterioration is mainly due to the increased chemical attack of the combustion gases on the tubular member at low temperature.

The object of my invention is to provide an improved construction and arrangement whereby the aforementioned drawback is successfully overcome. This is accomplished in accordance with my invention by the provision of means for reducing the cooling effect on the tubular member surrounding the piston stem.

For a better understanding of what I believe to be novel and my invention, attention is directed to the following description and the claims appended thereto in connection with the accompanying drawing.

The single figure of the drawing illustrates a double acting piston for an internal combustion engine embodying my invention.

The arrangement shown in the drawing comprises two hollow piston members, an outer member 10 and an inner member 11, rigidly secured to one end of a piston stem 12, whose other end is connected to a cross head 12a, diagrammatically shown. The piston stem 12 is surrounded by two tubular members 13 and 14. The upper ends of these tubular members 13 and 14 are provided with shoulder portions 15 and 16, respectively engaging each other and held in position between the piston member 11 and a ring 17 integrally formed on the stem 12. These members are rigidly secured together by means of bolts 18 engaging portions of the two piston members 10 and 11. The spaces or chambers defined within the piston members 10 and 11 communicate through a tube 19. The cylindrical surfaces of the piston members 10 and 11 have grooves 20 for receiving packing rings 21. The space defined intermediate the axially spaced piston members 10 and 11 is enclosed by a cylindrical member 22 suitably secured to the piston members so that its outer surface forms a smooth continuation of the outer surfaces of said piston members. The piston stem 12 has an axial channel 23 for receiving cooling medium such as water. The cooling medium is conducted to the space 24 defined within the piston member 10 whence it flows through the tube 19 into the space 25 defined within the piston member 11. The cooling medium is conducted from the space 25 through a curved conduit 26 into the annular spaces 27, 31 defined between the piston stem and the concentrically arranged tubes 13 and 14 respectively. The arrangement is such that the flow of cooling medium takes place primarily through the space 27 defined between the piston and the inner tubular member 13. The inner tubular member 13 has an opening 28 for conducting cooling medium from the curved conduit 26 into the space 27. The cooling medium is discharged from the space 27 through an opening 29 defined in a member 30 secured to the stem and the tubular members 13 and 14. A portion of the cooling medium discharged by the curved conduit 26 flows into the annular space 31 defined between the two tubular members 13 and 14. In the present instance the lower end of the inner tubular member 13 has an opening 32 permitting the discharge of fluid from the annular space 31 into the lower end of the annular space 27. The provision of the inner tubular member 13 is an important feature of my invention in that it reduces to a considerable extent the cooling effect on the outer tubular member 14 and thereby reduces the chemical attack of the combustion gases on the outer surface of said outer tubular member 14.

It is important to note that the flow of cooling medium is directed first through the axial channel in the piston stem and, after the cooling medium has passed the two series connected spaces 24 and 25 in the piston members 10 and 11 respectively, it is directed into the annular spaces 27 and 31. The cooling medium flows slowly through the annular space 31 whereby undesirable intensive cooling of the tubular member 14 is prevented.

The inner tubular member 13 disposed concentrically between the piston stem 12 and the outer tubular member 14 represents from another viewpoint a means defining a path of high resistance to flow along the inner surface of the outer tubular member, thereby reducing the velocity of the cooling medium adjacent the inner surface of the outer tubular member 14. In the present instance I have shown an opening 32 near the lower end of the inner tubular member 13. This opening may be omitted in certain cases.

Having described the method of operation of my invention together with the apparatus which I now consider to represent the best embodiment thereof, I desire to have it understood that the apparatus shown is only illustrative and that the invention may be carried out by other means.

What I claim as new and desire to secure by Letters Patent of the United States, is:—

1. In a double acting internal combustion engine, the combination of a hollow piston, a piston stem secured to the piston and having an axial channel for conducting cooling medium to the piston, a tubular member surrounding the piston stem and defining an annular space for conducting cooling medium discharged from the hollow piston, and means for reducing the cooling effect of such medium on the tubular member.

2. In a double acting internal combustion engine, the combination of a hollow piston, a stem secured to the piston and having an axial channel for conducting cooling medium to the piston, a tubular member surrounding the piston stem and defining an annular space for conducting cooling medium discharged from the hollow piston, and means for reducing the cooling effect of such medium on the tubular member, said means comprising another tubular member concentrically disposed intermediate the piston stem and the first mentioned tubular member defining a path of high resistance to flow along the surface of said first mentioned tubular member.

3. In a double acting internal combustion engine, the combination of a piston comprising two hollow members, a hollow piston stem secured to said members, means including an axial channel in the piston stem for conducting cooling medium to one of the piston members and from said piston member to the other piston member, a tubular member surrounding the piston stem and defining an annular space for conducting the cooling medium discharged from the other piston member, and means reducing the flow of cooling medium along the inner surface of said tubular member comprising another tubular member concentrically disposed intermediate the piston stem and the first mentioned tubular member.

4. In a combustion engine, the combination of a hollow piston, a piston-stem secured to said piston having a channel for conducting a cooling medium to said piston, a tubular member surrounding said piston-stem and defining a space for conducting the cooling medium discharged from the said piston and means for reducing the cooling effect of said cooling medium on said tubular member including a second tubular member surrounding said piston-stem and spaced from said first mentioned member in a manner to provide a high resistance to fluid flowing along the inner surface of said first mentioned member.

5. In a combustion engine, the combination of a hollow piston, a piston-stem secured to said piston having a channel for conducting a cooling medium to said piston, a tubular member surrounding said piston-stem and defining a space for conducting the cooling medium discharged from the said piston and means for reducing the cooling effect of said cooling medium on said tubular member including a second tubular member surrounding said piston-stem and spaced from said first mentioned member in a manner to reduce the velocity of the discharge fluid flowing along the inner surface of said first mentioned member.

JOHANNES RADLOFF.